(12) United States Patent
Ishikawa et al.

(10) Patent No.: US 11,600,449 B2
(45) Date of Patent: *Mar. 7, 2023

(54) LAYER COMPOSITIONS WITH IMPROVED ELECTRICAL PARAMETERS COMPRISING PEDOT/PSS AND A STABILIZER

(71) Applicant: Heraeus Deutschland GmbH & Co. KG

(72) Inventors: Akio Ishikawa, Tokyo (JP); Udo Merker, Cologne (DE); Klaus Wussow, Netphen (DE); Katrin Asteman, Cologne (DE)

(73) Assignee: HERAEUS PRECIOUS METALS GMBH & CO. KG, Hanau (DE)

( * ) Notice: Subject to any disclaimer, the term of this patent is extended or adjusted under 35 U.S.C. 154(b) by 1260 days.

This patent is subject to a terminal disclaimer.

(21) Appl. No.: 16/017,165

(22) Filed: Jun. 25, 2018

(65) Prior Publication Data
US 2018/0374649 A1    Dec. 27, 2018

Related U.S. Application Data

(62) Division of application No. 13/877,000, filed as application No. PCT/EP2011/004881 on Sep. 30, 2011, now Pat. No. 10,109,427.
(Continued)

(30) Foreign Application Priority Data

Oct. 1, 2010 (DE) ................ 10 2010 047 086.4

(51) Int. Cl.
*H01G 9/025* (2006.01)
*C08L 25/18* (2006.01)
(Continued)

(52) U.S. Cl.
CPC ............. *H01G 9/025* (2013.01); *C08K 5/132* (2013.01); *C08L 25/18* (2013.01); *C08L 65/00* (2013.01);
(Continued)

(58) Field of Classification Search
None
See application file for complete search history.

(56) References Cited

U.S. PATENT DOCUMENTS

| 4,910,645 A | 3/1990 | Jonas et al. |
| 5,300,575 A | 4/1994 | Jonas et al. |

(Continued)

FOREIGN PATENT DOCUMENTS

| DE | 102005043828 A1 | 3/2007 |
| DE | 102005059608 A1 | 6/2007 |

(Continued)

OTHER PUBLICATIONS

Jonas et al., "Conductive modifications of polymers with polypyrroles and polythiophenes", Synthetic Metals, vol. 41, No. 3, pp. 831-836.
(Continued)

*Primary Examiner* — Dion R. Ferguson
(74) *Attorney, Agent, or Firm* — Faegre Drinker Biddle & Reath LLP

(57) ABSTRACT

The present invention relates to a process for the production of a layer composition (10) with an electrically conductive layer (11), comprising the process steps:
  a) provision of a substrate (12) with a substrate surface (13);
  b) formation of a polymer layer (14) comprising an electrically conductive polymer (15) on at least a part of the substrate surface (13);
  c) application of a liquid stabilizer phase, comprising a stabilizer and a liquid phase, to the polymer layer (14)
(Continued)

Figure 1:
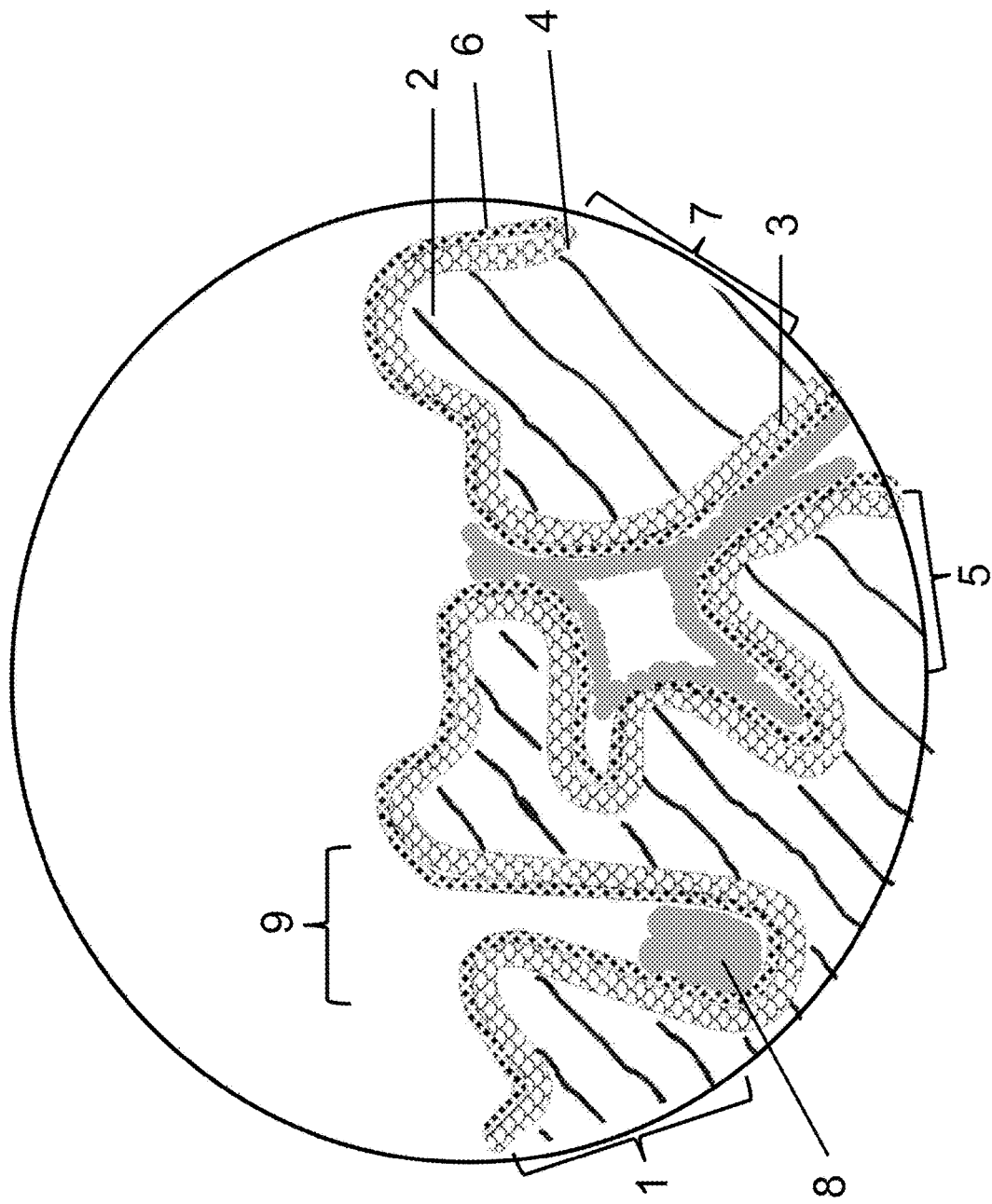

from process step b), wherein the stabilizer phase comprises less than 0.2 wt. %, based on the stabilizer phase, of the electrically conductive polymer, wherein the stabilizer is an aromatic compound with at least two OH groups, and a layer composition (10) and uses thereof.

30 Claims, 2 Drawing Sheets

Related U.S. Application Data

(60) Provisional application No. 61/392,253, filed on Oct. 12, 2010.

(51) Int. Cl.
| | | |
|---|---|---|
| *C08L 65/00* | (2006.01) | |
| *C09D 5/24* | (2006.01) | |
| *H01G 9/028* | (2006.01) | |
| *C09D 165/00* | (2006.01) | |
| *C08K 5/132* | (2006.01) | |
| *H01G 11/48* | (2013.01) | |
| *H01G 11/56* | (2013.01) | |
| *H01G 9/00* | (2006.01) | |
| *C08K 5/13* | (2006.01) | |

(52) U.S. Cl.
CPC ............ *C09D 5/24* (2013.01); *C09D 165/00* (2013.01); *H01G 9/0036* (2013.01); *H01G 9/028* (2013.01); *H01G 11/48* (2013.01); *H01G 11/56* (2013.01); *C08G 2261/3223* (2013.01); *C08K 5/13* (2013.01); *Y02E 60/13* (2013.01); *Y10T 428/31533* (2015.04)

(56) References Cited

U.S. PATENT DOCUMENTS

| | | | | |
|---|---|---|---|---|
| 5,694,287 | A * | 12/1997 | Nishiyama | H01G 9/025 |
| | | | | 29/25.03 |
| 7,497,879 | B2 | 3/2009 | Kakuma et al. | |
| 8,420,671 | B2 * | 4/2013 | Reuter | H01G 11/56 |
| | | | | 514/316 |
| 10,109,427 | B2 * | 10/2018 | Ishikawa | C08L 65/00 |
| 2002/0195592 | A1 | 12/2002 | Geer et al. | |
| 2004/0260016 | A1 * | 12/2004 | Louwet | H01B 1/127 |
| | | | | 524/817 |
| 2006/0076541 | A1 | 4/2006 | Yoshida et al. | |
| 2006/0286760 | A1 | 12/2006 | Kirschbaum | |
| 2008/0096036 | A1 | 4/2008 | Bharadwaj et al. | |
| 2009/0001359 | A1 * | 1/2009 | Worle | H01L 51/002 |
| | | | | 257/E51.024 |
| 2009/0185330 | A1 | 7/2009 | Breznova et al. | |
| 2010/0075139 | A1 * | 3/2010 | Kato | C08J 7/044 |
| | | | | 428/688 |
| 2010/0136329 | A1 | 6/2010 | Kato et al. | |
| 2011/0128675 | A1 | 6/2011 | Merker et al. | |
| 2011/0164348 | A1 | 7/2011 | Merker et al. | |
| 2012/0075772 | A1 | 3/2012 | Merker et al. | |

FOREIGN PATENT DOCUMENTS

| | | | |
|---|---|---|---|
| DE | 102008043238 A1 | 7/2009 | |
| EP | 340512 A2 | 11/1989 | |
| EP | 440957 A2 | 8/1991 | |
| EP | 0663673 A1 | 7/1995 | |
| EP | 0700061 A1 | 3/1996 | |
| EP | 1798259 A1 | 6/2007 | |
| EP | 1808875 A1 | 7/2007 | |
| JP | 08-078292 A | 3/1996 | |
| JP | 3473273 B2 | 12/2003 | |
| JP | 2007180259 A | 7/2007 | |
| JP | 2007287841 A | 11/2007 | |
| JP | 2008-109068 A | 5/2008 | |
| KR | 20080036985 A | 4/2008 | |
| TW | 2006-24504 A | 7/2006 | |
| WO | WO-2006133971 A1 | 12/2006 | |
| WO | WO-2008/055834 A1 | 5/2008 | |
| WO | WO-2009141209 A1 | 11/2009 | |
| WO | WO-2010003874 A2 | 1/2010 | |
| WO | WO-2010102751 A2 * | 9/2010 | ............... C09D 5/24 |

OTHER PUBLICATIONS

European Search Report for application No. 11784934.9-1302, dated Mar. 22, 2017.
Kazuyoshi, Y., et al., "Low-impedance solid electrolytic capacitor having electric conductivity improver on interface between dielectric layer and cathode and manufacture thereof", Database CAPLUS, Accession No. 2007=760142, XP002465382, Jul. 13, 2007.
International Search Report for PCT /EP2011/004881 dated Dec. 23, 2011.
Jonas et al., "Conductive modifications of polymers with polypyrroles and polythiophenes", Synthetic Metals, vol. 41, No. 3, pp. 831-836, 1991.

* cited by examiner

LAYER COMPOSITIONS WITH IMPROVED ELECTRICAL PARAMETERS COMPRISING PEDOT/PSS AND A STABILIZER

CROSS-REFERENCE TO RELATED APPLICATIONS

This application is a divisional application of U.S. patent application Ser. No. 13/877,000, filed Jul. 10, 2013 which is incorporated by reference. U.S. patent application Ser. No. 13/877,000 is a national stage application (under 35 U.S.C. § 371) of PCT/EP2011/004881, filed Sep. 30, 2011, which claims benefit of German application 10 2010 047 086.4, filed Oct. 1, 2010, and U.S. Provisional Application No. 61/392,253, filed Oct. 12, 2010.

BACKGROUND OF THE INVENTION

The present invention relates generally to a process for the production of a layer composition by treatment of electrically conductive polymers with stabilizers, layer compositions and the use of such layer compositions.

Electrically conductive polymers from the class of polypyrroles, polyanilines and polythiophenes are known from the literature. Poly(3,4-alkylenedioxythiophene) dispersions in particular have recently acquired technical importance, since they can be used, for example, for the production of conductive or antistatic coatings (see e.g. EP-A 440 957). In practice, however, it has been found that the electrical conductivity of the coatings from such dispersions is not always sufficiently stable for practical uses at a higher temperature.

EP 1 798 259 A1 and WO 2008/055834 A1 describe that the heat stability of the electrical conductivity of coatings containing polythiophene dispersions can be increased if, for example, derivatives of gallic acid (3,4,5-trihydroxybenzoic acid) are added. Nevertheless, the addition of these stabilizers often leads to the dispersions used becoming unstable. Furthermore, these stabilizers cannot be added to reactive mixtures of monomers and oxidizing agents for the production of conductive coatings, since these stabilizers interfere in the oxidative polymerization, e.g. by complexing with the oxidizing agent.

There therefore continued to be a need for processes for the production of electrically conductive layers from conductive polymers with improved temperature stability and layer compositions comprising these.

One of the main fields of use for electrically conductive layer compositions comprising conductive polymers is solid electrolyte capacitors.

A commercially available electrolyte capacitor as a rule is made of a porous metal electrode, an oxide layer on the metal surface, an electrically conductive material, usually a solid, which is introduced into the porous structure, an outer electrode (contacting), such as e.g. a silver layer, and further electrical contacts and an encapsulation. An electrolyte capacitor which is frequently used is the tantalum electrolyte capacitor, the anode electrode of which is made of the valve metal tantalum, on which a uniform, dielectric layer of tantalum pentoxide has been generated by anodic oxidation (also called "forming"). A liquid or solid electrolyte forms the cathode of the capacitor. Aluminium capacitors in which the anode electrode is made of the valve metal aluminium, on which a uniform, electrically insulating aluminium oxide layer is generated as the dielectric by anodic oxidation, are furthermore frequently employed. Here also, a liquid electrolyte or a solid electrolyte forms the cathode of the capacitor. The aluminium capacitors are usually constructed as wound- or stack-type capacitors.

$\pi$-conjugated polymers are particularly suitable as solid electrolytes in the capacitors described above because of their high electrical conductivity. $\pi$-conjugated polymers are also called conductive polymers or synthetic metals. They are increasingly gaining economic importance, since polymers have advantages over metals with respect to processability, weight and targeted adjustment of properties by chemical modification. Examples of known $\pi$-conjugated polymers are polypyrroles, polythiophenes, polyanilines, polyacetylenes, polyphenylenes and poly(p-phenylene-vinylenes), a particularly important polythiophene used technically being poly(3,4-ethylenedioxythiophene) (PEDOT), since it has a very high conductivity in its oxidized form.

The solid electrolytes based on conductive polymers can be applied to the oxide layer in various ways and manners. EP-A-0 340 512 thus describes, for example, the preparation of a solid electrolyte from 3,4-ethylenedioxythiophene and the use thereof in electrolyte capacitors. According to the teaching of this publication, 3,4-ethylene-dioxythiophene is polymerized on to the oxide layer in situ.

The disadvantage of the production of solid electrolyte capacitors using an in situ polymerization is however, amongst others, the complexity of the process. Thus, a polymerization process which in each case comprises the process steps of impregnation, polymerization and washing as a rule lasts several hours. Under certain circumstances, explosive or toxic solvents must also be employed here. A further disadvantage of the in situ process for the production of solid electrolyte capacitors is that as a rule anions of the oxidizing agent or, where appropriate, other monomeric anions serve as counter-ions for the conductive polymer. Because of their small size, however, these are not bonded to the polymer in a sufficiently stable manner. As a result, diffusion of the counter-ions and therefore an increase in the equivalent series resistance (ESR) of the capacitor may occur, especially at elevated use temperatures of the capacitor. The alternative use of high molecular weight polymeric counter-ions in the chemical in situ polymerization does not lead to sufficiently conductive films and therefore does not lead to low ESR values.

Alternative processes for the preparation of solid electrolytes based on conductive polymers in electrolyte capacitors have therefore been developed in the prior art. Thus, for example, DE-A-10 2005 043828 describes a process for the production of solid electrolytes in capacitors, in which a dispersion comprising the already polymerized thiophene, for example the PEDOT/PSS dispersions known from the prior art, is applied to the oxide layer arid the dispersing agent is then removed by evaporation.

Generally, the object according to the invention was to eliminate or at least mitigate the disadvantages emerging from the prior art.

The object of the present invention was furthermore to provide layer compositions which can be produced easily with conductive polymers and display good properties in capacitors and other uses, such as antistatic layer compositions. Furthermore, a process for the production of these layer compositions which can readily be used commercially, especially in the abovementioned uses, is to be provided.

A further object was to improve the heat stability of such layer compositions, in particular as polymer solid electrolyte capacitors.

Furthermore, an object according to the invention was to provide a layer composition which, in particular as a capacitor, displays advantageous properties, such as an equivalent series resistance (ESR) which increases as little as possible and a dissipation factor which likewise increases just as little, with a capacitance which is as constant as possible. In the case of layers, a lowest possible increase in the surface resistance was to be achieved.

A contribution towards achieving at least one of the abovementioned objects is made by a process for the production of a layer composition with an electrically conductive layer, comprising the process steps:
  a) provision of a substrate with a substrate surface;
  b) formation of a polymer layer comprising an electrically conductive polymer on at least a part of the substrate surface;
  c) application of a liquid stabilizer phase, comprising a stabilizer and a liquid phase, to the polymer layer from process step b), wherein the stabilizer phase contains less than 0.2 wt. %, based on the stabilizer phase, of the electrically conductive polymer,
wherein the stabilizer is an aromatic compound having at least two, preferably at least three, further preferably at least four and furthermore preferably at least six OH groups.

It has been found, completely surprisingly, that the application of stabilizers to an electrically conductive polymer layer containing conductive polymers, in particular in capacitors, leads to a significant improvement in the heat stability of the layer or of the capacitor.

A BRIEF DESCRIPTION OF THE FIGURES

FIG. 1 is a schematic diagram of a section through a part of a capacitor as an example of a layer composition according to the invention. This has an electrode body 1, usually made of a porous electrode material 2, such as aluminium. On the electrode surface 4 of the electrode material 2, a dielectric 3 is formed as a thin layer, so that an anode body 5 which is still porous and comprises the electrode body 1 of the electrode material 2 and the dielectric 3 is formed and, in the context of the layer composition according to the invention, can be regarded as the substrate, the surface of the anode body 5 representing a substrate surface 13 according to the invention. The dielectric 3 is followed, optionally after further layers, by a layer of a solid electrolyte 6 (e.g. of PEDOT/PSS particles), which is the polymer layer or layers, whereby a capacitor body 7 comprising the electrode body 1 of the electrode material 2, the dielectric 3 and the solid electrolyte 6 is formed. The solid electrolyte 6 is followed by a layer of a stabilizer 8, so that a capacitor comprising the electrode body 1 of the electrode material 2, the dielectric 3, the solid electrolyte 6 and the stabilizer 8 is formed. The stabilizer is introduced into the capacitor body 7, for example, such that it completely or partly fills the pores 9.

Figure 2:
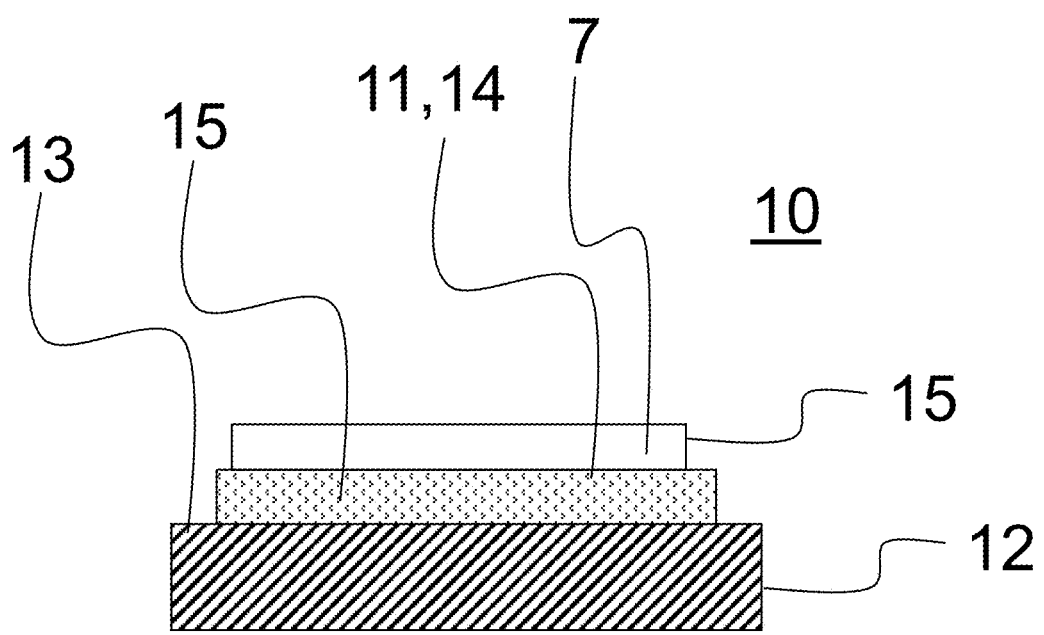

FIG. 2 shows the structure of a layered body 10 according to the invention, for example an antistatic film, in a more general form. On a substrate 12, in the case of the antistatic film often a PE, PP or PET layer, there is on the substrate surface 13 thereof a conductive layer 11, which is formed as a polymer layer 14 from an electrically conductive polymer 15. On the conductive layer 11, a stabilizer layer 15 with stabilizer 7 is formed.

A DETAILED DESCRIPTION OF THE INVENTION

In the process according to the invention, it is preferable, after application of the stabilizer phase in process step c), for the liquid phase to be at least partly removed in a further process step d). It is preferable here that the liquid phase is removed to the extent of at least 70 wt. %, preferably at least 90 wt. % and particularly preferably to the extent of at least 98 wt. %, in each case based on the amount of liquid phase employed in process step c). The liquid phase is often also removed virtually completely.

In connection with the stabilizer, it is furthermore preferable for this to have a molecular weight of 110 g/mol and more, preferably 200 g/mol and more, particularly preferably 300 g/mol and more, extremely preferably 500 g/mol and more, very particularly preferably 1,000 g/mol and more and in a particular embodiment 1,500 g/mol and more. Only in rare cases does the molecular weight of the stabilizer exceed 10,000 g/mol. Preferred embodiments according to the invention with stabilizers with in each case a molecular weight range of from 110 to 200 g/mol, of from more than 200 to 300 g/mol, of from more than 300 to 700 g/mol, of from more than 700 g/mol to 1,200 g/mol or of from more than 1,200 g/mol to 2,000 g/mol thus result. It is furthermore possible for the stabilizer to comprise two and more molecules of different molecular weights, preferably of those stated above.

Electrically conductive layer here is understood as meaning, amongst others, also those layers which already have a low electrical conductivity and are often also called an antistatic layer. Generally, electrical conductivity of the layers means that these have a conductivity preferably in the range of from 1 μS/cm to 10,000 S/cm.

A substrate is first provided in process step a) of the process according to the invention. Substrates can be made of, for example, paper, polymers, glass or ceramic. For optical uses, the substrate is preferably transparent or light-transmitting. Transparent substrates can be made of glass, extremely thin glass (flexible glass) or plastics. Particularly suitable plastics are: polycarbonates, polyesters, such as e.g. PET and PEN (polyethylene terephthalate or polyethylene-naphthalene dicarboxylate), copolycarbonates, polysulphone, polyether sulphone (PES), polyimide, polyethylene, polypropylene or cyclic polyolefins or cyclic olefin copolymers (COC), hydrogenated styrene polymers or hydrogenated styrene copolymers. Rigid or flexible substrates can be used.

In a particular embodiment of the use, such as in capacitors, it is preferable for the substrate to comprise an electrode body of an electrode material, the surface of this electrode material being at least partly covered by a dielectric. In the present case, an electrode body coated with a dielectric is called an anode body. An anode body can also have further layers, in addition to the electrode and the dielectric. The surface of the anode body, often the dielectric, which can optionally also have further layers, is a substrate surface in the context of the present invention.

In principle, the electrode body can be produced by pressing a valve metal powder of high surface area and sintering it to give a mostly porous electrode body. An electrical contact wire, preferably of a valve metal, such as e.g. tantalum, is conventionally also pressed into the electrode body here. The electrode body is then coated, for example by electrochemical oxidation, with a dielectric, i.e. an oxide layer. Alternatively, metal foils can also be etched and coated with a dielectric by electrochemical oxidation in order to obtain an anode foil with a porous region. In a wound capacitor, an anode foil with a porous region, which forms the electrode body, and a cathode foil are separated by separators and wound up.

In the context of the invention, valve metal is to be understood as meaning those metals of which the oxide layers do not render possible current flow equally in both directions. In the case of an anodically applied voltage, the oxide layers of the valve metals block the current flow, while in the case of a cathodically applied voltage large currents occur, which may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds with electrical properties comparable to a valve metal are those with metallic conductivity, which can be oxidized and of which the oxide layers have the properties described above. For example, NbO has metallic conductivity, but in general is not regarded as a valve metal. Layers of oxidized NbO have, however, the typical properties of valve metal oxide layers, so that NbO or an alloy or compound of NbO with other elements are typical examples of such compounds with electrical properties comparable to a valve metal. Electrode materials of tantalum, aluminium and those electrode materials based on niobium or niobium oxide are preferred. Aluminium is particularly preferred as the electrode material.

For production of the electrode body often with a porous region, the valve metals can be sintered, for example in powder form, to give a mostly porous electrode body, or a porous structure is stamped on a metallic body. The latter can be carried out e.g. by etching a foil.

For simplicity, bodies with a porous region are also called porous in the following. Thus, for example, electrode bodies with a porous region are also called porous electrode bodies. On the one hand, the porous bodies can be permeated by a plurality of channels and therefore be sponge-like. This is often the case if tantalum is used for construction of the capacitor. Furthermore, it is possible for only the surface to have pores and for the region following under the surface pores to be solid in construction. Such a situation is often observed if aluminium is used for the capacitor construction.

The often porous electrode bodies produced in this manner are then oxidized, for example, in a suitable electrolyte, such as e.g. phosphoric acid or an aqueous solution of ammonium adipate, by application of a voltage, in order to form the dielectric. The level of this forming voltage depends on the oxide layer thickness to be achieved or the later use voltage of the capacitor. Preferred forming voltages are in a range of from 1 to 2,000 V, particularly preferably in a range of from 30 to 1,900 V, very particularly preferably in a range of 50-1,600 V and extremely preferably in a range of 100-1,500 V and furthermore preferably 150-1,400 V.

The as a rule porous electrode bodies employed preferably have a porosity of from 10 to 90%, preferably from 30 to 80%, particularly preferably from 50 to 80% and an average pore diameter of from 10 to 10,000 nm, preferably from 50 to 5,000 nm, particularly preferably from 100 to 3,000 nm.

If the layer composition according to the invention is an aluminium wound capacitor or part of such, an anode body is provided as the substrate as follows: in process step a), a porous aluminium foil is formed anodically as the electrode material, whereby an aluminium oxide coating is formed as the dielectric. The aluminium foil (anode foil) obtained in this manner is then provided with a contact wire and wound up with a further aluminium foil (cathode foil) likewise provided with a contact wire, these two foils being spaced from one another by one or more separator papers, which are based e.g. on cellulose or, preferably, on synthetic papers. After being wound up, the anode bodies obtained in this way are fixed, for example by means of an adhesive tape. The separator paper or papers can be carbonized by heating in an oven. This method and manner of production of anode bodies for aluminium wound capacitors is adequately known from the prior art and is described, for example, in U.S. Pat. No. 7,497,879 B2.

In process step b) of the process according to the invention, a polymer layer comprising an electrically conductive polymer is then formed on at least a part of the substrate surface; For this, precursors of conductive polymers (called precursors in the following), a solution of conductive polymers or a dispersion which contains particles of an electrically conductive polymer (preferably with a dispersing agent) are applied onto the substrate. If anode bodies are used as the substrate, the precursors, the solution or dispersion are introduced into the porous region of the anode body. The application of dispersions which contain particles of an electrically conductive polymer suspended in a dispersing agent is preferred. In general, dispersions which contain particles of an electrically conductive polymer are preferably employed.

The precursors, solutions or dispersions are applied to the substrate surface by known processes, e.g. immersion, dipping, pouring, dripping on, spraying, misting on, knife coating, brushing or printing, for example ink-jet, screen or tampon printing. For anode bodies, the application is preferably carried out by dipping the anode body provided in process step a) into the dispersion and thus impregnating it with this dispersion. The dipping into or the impregnation with the dispersion is preferably carried out for a period in a range of from 1 second to 120 minutes, particularly preferably in a range of from 10 seconds to 60 minutes and most preferably in a range of from 30 seconds to 15 minutes. The introduction of the dispersion into the anode body can be facilitated, for example, by increased or reduced pressure, vibration, ultrasound or heat. These conditions are also preferred for other layer compositions.

The application of the precursors, solutions or dispersions can be carried out directly on to the substrate or using an adhesion promoter, for example a silane, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane, and/or one or more other functional layers.

If anode bodies are used as the substrate, as a result of the application the dispersion preferably covers the pores of the porous region rather less. Rather, the surfaces of the cavities of the pores are at least partly coated with the dispersion. The particles present in the dispersion thus not only form a layer covering the openings of the pores; at least parts and often also all regions of the surface of the pores are also covered with a layer of the particles of the dispersion, as a result of which these particles are introduced into the anode body.

Corresponding monomers, for example, are understood as precursors for the preparation of conductive polymers. Mixtures of various precursors can also be used. Suitable monomeric precursors are, for example, optionally substituted thiophenes, pyrroles or anilines, preferably optionally substituted thiophenes, particularly preferably optionally substituted 3,4-alkylenedioxythiophenes.

The term "polymers" as used in the context of the present invention includes, in the context of the invention, all compounds with more than one identical or different recurring unit.

Here in particular, "conductive polymers" are understood as meaning the compound class of π-conjugated polymers which have an electrical conductivity after oxidation or reduction. Preferably, conductive polymers are understood as meaning those π-conjugated polymers which, after oxidation, have an electrical conductivity of the order of at least 0.1 S cm$^{-1}$.

The electrically conductive polymer preferably comprises at least one polythiophene, polypyrrole or polyaniline, which are optionally substituted. Particularly preferably, the electrically conductive polymer comprises at least one polythiophene with recurring units chosen from the group consisting of the general formula (I), the general formula (II) or the general formula (III) or a combination of at least two of these. In the following possible variants, the electrically conductive polymer contains at least one polythiophene with recurring units of the general formula (I) or of the general formula (II) or of the general formula (III) or recurring units of the formulae (I) and (II) or recurring units of the formulae (I) and (III) or recurring units of the formulae (II) and (III) or recurring units of the formulae (I), (II) and (III)

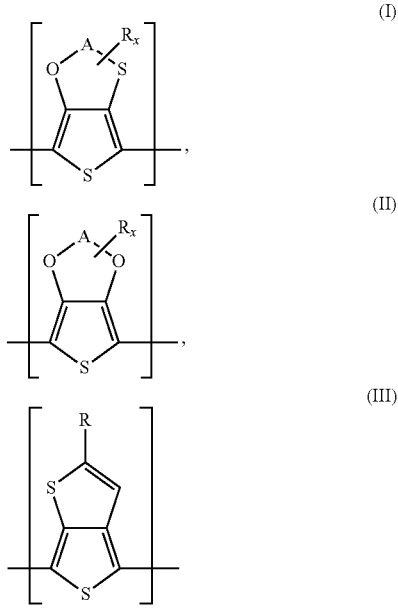

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.

The general formulae (I) and (II) are to be understood as meaning that x substituents R can be bonded to the alkylene radical A.

Polythiophenes with recurring units of the general formula (I) or (II) or recurring units of the general formula (I) and (II), wherein A represents an optionally substituted $C_2$-$C_3$-alkylene radical and x represents 0 or 1 are particularly preferred.

Poly(3,4-ethylenedioxythiophene), which is optionally substituted, is very particularly preferred as the conductive polymer.

In the context of the invention, the prefix poly- is to be understood as meaning that the polymer or polythiophene contains more than one identical or different recurring unit. The polythiophenes contain a total of n recurring units of the general formula (I) or of the general formula (II) or of the general formula (III) or of the general formulae (I) and (II) or of the general formulae (I) and (III) or of the general formulae (II) and (III) or of the general formulae (I), (II) and (III), wherein n is an integer from 2 to 2,000, preferably 2 to 100. The recurring units of the general formula (I) or of the general formula (II) or of the general formula (III) or the recurring units of the general formulae (I) and (II) or the recurring units of the general formulae (I) and (III) or the recurring units of the general formulae (II) and (III) or the recurring units of the general formulae (I), (II) and (III) can in each case be identical or different within a polythiophene. Polythiophenes with in each case identical recurring units of the general formula (I) or of the general formula (II) or of the general formula (III) or with in each case identical recurring units of the general formulae (I) and (II), or of the general formulae (I) and (III), or of the general formulae (II) and (III), or with in each case identical recurring units of the general formulae (I), (II) and (III) are preferred. Polythiophenes with in each case identical recurring units of the general formula (I) or of the general formula (II) or with in each case identical recurring units of the general formulae (I) and (II) are particularly preferred.

The polythiophenes preferably in each case carry H on the end groups.

In the context of the invention, $C_1$-$C_5$-alkylene radicals A are preferably methylene, ethylene, n-propylene, n-butylene or n-pentylene. $C_1$-$C_{18}$-alkyl radicals R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-Tolyl, 2,3-, 2,4-, 2,5-, 2,6-, 3,4-, 3,5-xylyl or mesityl. The preceding list serves to illustrate the invention by way of example and is not to be considered conclusive.

In the context of the invention, numerous organic groups are possible optional further substituents of the radicals A and/or of the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxamide groups.

Possible substituents for polyaniline or polypyrrole are, for example, the radicals A and R listed above and/or the further substituents of the radicals A and R. Unsubstituted polyanilines are preferred.

The context of the invention includes all the radical definitions, parameters and explanations above and given in the following which are general or mentioned in preferred ranges, in any desired combination with one another, that is to say also between the particular ranges and preferred ranges.

The polythiophenes employed according to the invention can be neutral or cationic. In preferred embodiments they are cationic, "cationic" relating only to the charges on the polythiophene main chain. The polythiophenes can carry positive and negative charges in the structural unit, depending on the substituent on the radicals R, the positive charges being on the polythiophene main chain and the negative charges optionally being on the radicals R substituted by sulphonate or carboxylate groups. In this context, the positive charges of the polythiophene main chain can be partly or completely compensated by the anionic groups optionally present on the radicals R. Overall, in these cases the polythiophenes can be cationic, neutral or even anionic. Nevertheless, in the context of the invention they are all regarded as cationic polythiophenes, since the positive charges on the polythiophene main chain are the deciding factor. The positive charges are not shown in the formulae, since their precise number and position cannot be determined absolutely. However, the number of positive charges is at least 1 and at most n, wherein n is the total number of all recurring units (identical or different) within the polythiophene.

To compensate the positive charge, if this is not already done by the optionally sulphonate- or carboxylate-substituted and therefore negatively charged radicals R, the cationic polythiophenes require anions as counter-ions.

Counter-ions can be monomeric or polymeric anions, the latter also being called polyanions in the following.

Polymeric anions are preferable to monomeric anions, since they contribute towards film formation and because of their size lead to electrically conductive films which are more stable to heat.

Polymeric anions here can be, for example, anions of polymeric carboxylic acids, such as polyacrylic acids, polymethacrylic acid or polymaleic acids, or polymeric sulphonic acids, such as polystyrenesulphonic acids and polyvinylsulphonic acids. These polycarboxylic and -sulphonic acids can also be copolymers of vinylcarboxylic and vinylsulphonic acids with other polymerizable monomers, such as acrylic acid esters and styrene.

Preferably, the particles mentioned contain an anion of a polymeric carboxylic or sulphonic acid as the polymeric anion.

The anion of polystyrenesulphonic acid (PSS), which, if a polythiophene is used, in particular poly(3,4-ethylenedioxythiophene), is preferably present bonded as a complex in the form of the PEDOT/PSS complexes known from the prior art, is particularly preferred as the polymeric anion. Such complexes are obtainable by polymerizing the thiophene monomers, preferably 3,4-ethylenedioxythiophene, oxidatively in aqueous solution in the presence of polystyrenesulphonic acid.

The molecular weight of the polyacids which supply the polyanions is preferably 1,000 to 2,000,000, particularly preferably 2,000 to 500,000. The polyacids or their alkali metal salts are commercially obtainable, e.g. polystyrenesulphonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

Polymeric anion(s) and electrically conductive polymers can be present in particular in a weight ratio of from 0.5:1 to 50:1, preferably from 1:1 to 30:1, particularly preferably 2:1 to 20:1. The weight of the electrically conducting polymers here corresponds to the weight of the monomers employed, assuming that complete conversion takes place during the polymerization.

Monomeric anions which are used are, for example, those of $C_1$-$C_{20}$-alkanesulphonic acids, such as methane-, ethane-, propane-, butanesulphonic acid or higher sulphonic acids, such as dodecanesulphonic acid, of aliphatic perfluorosulphonic acids, such as trifluoromethanesulphonic acid, perfluorobutanesulphonic acid or perfluorooctanesulphonic acid, of aliphatic $C_1$-$C_{20}$-carboxylic acids, such as 2-ethylhexylcarboxylic acid, of aliphatic perfluorocarboxylic acids, such as trifluoroacetic acid or perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids, such as camphorsulphonic acid, or tetrafluoroborates, hexafluorophosphates, perchiorates, hexafluoroantimonates, hexafluoroarsenates or hexachloroantimonates.

The anions of p-toluenesulphonic acid, methanesulphonic acid or camphorsulphonic acid are preferred as the monomeric anions.

Cationic polythiophenes which contain anions as counterions for charge compensation are also often called polythiophene/(poly)anion complexes in the technical field.

The conductive polymers can also be prepared in situ by polymerization of the conductive polymer precursors which have been applied to the substrate. For this, corresponding monomers and oxidizing agent are preferably applied to the substrate together or in succession.

All the metal salts known to the person skilled in the art which are suitable for oxidative polymerization of thiophenes, anilines or pyrroles can be used as the oxidizing agent.

Suitable metal salts are metal salts of main group or sub-group metals, the latter also being called transition metal salts in the following, of the periodic table of the elements. Suitable transition metal salts are, in particular, salts of an inorganic or organic acid or inorganic acids of transition metals comprising organic radicals, such as e.g. with iron(III), copper(II), chromium(VI), cerium(IV), manganese(IV), manganese(VII) and ruthenium(III).

Preferred transition metal salts are those of iron(III).

Iron(III) p-toluenesulphonate, iron(III) o-toluenesulphonate or a mixture of iron(III) p-toluenesulphonate and iron (III) o-toluenesulphonate are very particularly preferred as metal salts.

The conductive polymer is preferably applied to the substrate in the form of solutions or dispersions. Application from a dispersion is very particularly preferred.

The particles, in particular the particles of the conductive polymer, of the dispersion comprising the conductive polymer preferably have a specific electrical conductivity of greater than 100 S/cm when used for layer compositions in capacitors. In this context, the specific electrical conductivity of the particles is the specific electrical conductivity of the film in the dried state, which forms from the particles on drying of the dispersion. Preferably, dispersions in which the particles have a specific electrical conductivity of greater than 150 S/cm, particularly preferably greater than 250 S/cm, very particularly preferably greater than 400 S/cm, extremely preferably greater than 750 S/cm are employed. In some cases particles with a specific conductivity of a maximum of 5,000 S/cm are also employed.

In a particular variant of the process according to the invention, the particles, in particular the particles of the conductive polymer, in the dispersion have a diameter $d_{50}$ in a range of from 1 to 70 nm, preferably in a range of from 1 to less than 40 nm, preferably one in a range of from 1 to 35 nm, particularly preferably a range of from 1 to 30 nm and very particularly preferably in a range of from 5 to 25 nm. The diameter of the particles is determined via an ultracentrifuge measurement by the method described herein. In a preferred variant of the process according to the invention, the particles, in particular of the conductive polymer, in the dispersion preferably have a $d_{90}$ value of the diameter distribution of less than 100 nm, particularly preferably less than 70 nm, very particularly preferably less than 50 nm. In a preferred variant of the process according to the invention, the particles, in particular of the conductive polymer, in the dispersion have a $d_{10}$ value of the diameter distribution of greater than 1 nm, particularly preferably greater than 3 nm, very particularly preferably greater than 5 nm.

The dispersion preferably has a purity with respect to metals and transition metals as described in the specification WO 2010/003874 A2 on p. 6, l. 10-29. The low concentrations of metals in the dispersions have the great advantage that when used for capacitors, the dielectric is not damaged during formation of the solid electrolyte and in later operation of the capacitor.

The solutions or dispersions of the electrically conductive polymer comprise one or more solvents or dispersing agents, preferred solvents or dispersing agents being water, organic solvents or mixtures of an organic solvent and water. Solvents or dispersing agents which may be mentioned are, for example, the following solvents: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulphoxides and sulphones, such as dimethylsulphoxide and sulpholane; aliphatic carboxylic acid amides, such as methylacetamide, dime thylacetamide and dimethylformamide; aliphatic and araliphatic ethers, such as, diethyl ether and anisole. Water or a mixture of water with the abovementioned organic solvents can furthermore also be used as the solvent or dispersing agent.

Preferred solvents and dispersing agents comprising conductive polymers are water or other protic solvents, such as alcohols, e.g. methanol, ethanol, i-propanol and butanol, and mixtures of water with these alcohols, water being the particularly preferred solvent and dispersing agent.

The solutions or dispersions comprising conductive polymers can moreover comprise further components, such as surface-active substances, e.g. ionic and nonionic surfactants, or adhesion promoters, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxy-propyltrimethoxysilane, vinyltrimethoxysilane or octyltriethoxysilane, crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane—polyurethanes, polyacrylates or polyolefin dispersions.

Preferably, the solutions or dispersions comprising conductive polymers comprise further additives which increase the conductivity, such as e.g. compounds comprising ether groups, such as e.g. tetrahydrofuran, compounds comprising lactone groups, such as γ-butyrolactone, γ-valerolactone, compounds comprising amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as e.g. sulpholane (tetramethylene sulphone), dimethylsulphoxide (DMSO), sugars or sugar derivatives, such as e.g. sucrose, glucose, fructose, lactose, sugar alcohols, such as e.g. sorbitol, mannitol, furan derivatives, such as e.g. 2-furancarboxylic acid, 3-furancarboxylic acid, and/or di- or polyalcohols, such as e.g. ethylene glycol, glycerol, di- and triethylene glycol. Tetrahydrofuran, N-methylformamide, N-methylpyrrolidone, ethylene glycol, dimethylsulphoxide or sorbitol are particularly preferably employed as conductivity-increasing additives.

The solutions or dispersions comprising conductive polymers preferably have a content of stabilizers of less than 0.2 wt. %, particularly preferably of less than 0.1 wt. %, very particularly preferably of less than 0.01 wt. %, in each case based on the total weight of the solution or dispersion. The solutions or dispersions extremely preferably contain no stabilizers. Stabilizers in the dispersion easily lead to an undesirable decrease in the storage stability of the dispersions containing conductive polymers.

The solutions or dispersions containing conductive polymers can moreover contain one or more organic binders which are soluble in organic solvents, as described in WO 2009/141209 A1 on p. 12, l. 16-34. The solutions or dispersions can have a pH of from 1 to 14, a pH of from 1 to 8 being preferred. When employed in capacitors, dispersions with a pH of from 2.5 to 8 are preferred for corrosion-sensitive dielectrics, such as, for example, aluminium oxides or niobium oxides, so that the dielectric is not damaged.

To adjust the pH, for example, bases or acids can be added to the solutions or dispersions comprising conductive polymers, as described in WO 2010/003874 A2 on p. 4, l. 13-32. Those additions which do not impair the film formation of the dispersions and are not volatile at higher temperatures, e.g. soldering temperatures, but remain in the solid electrolyte under these conditions, such as e.g. the bases 2-dimethylaminoethanol, 2,2'-iminodiethanol or 2,2',2"-nitrilotriethanol and the acid polystyrenesulphonic acid, are preferred.

The viscosity of the solution or dispersion containing conductive polymers can be between 0.1 and 1,000 mPa·s (measured with a rheometer at 20° C. and a shear rate of 100 $s^{-1}$), depending on the method of application. Preferably, the viscosity is 1 to 500 mPa·s, particularly preferably between 10 to 200 mPa·s, very particularly preferably 40 to 150 mPa·s.

The solids content of the solutions or dispersion employed in process step b) is preferably in a range of from 0.1 to 20 wt. %, particularly preferably in a range of from 0.5 to 10 wt. % and most preferably in a range of from 1 to 5 wt. %, in each case based on the total weight of the dispersion. The solids content is determined via drying of the dispersion at a temperature which is sufficiently high to remove the dispersing agent, but does not thereby decompose the solid.

Corresponding monomers or derivatives thereof are understood as precursors for the preparation of conductive polythiophenes of the particles in the dispersion, as described in WO 2010/003874 A2 on p. 17, l. 29 to p. 20, l. 24.

The particle size of the particles, in particular of the particulate conductive polymers, in the dispersion can be reduced, for example, by means of a high pressure homogenizer. This operation can also be repeated in order to magnify the effect. Pressures of between 100 and 2,000 bar in particular have proved to be advantageous for greatly reducing the particle size. Preparation of a polythiophene/polyanion complex and subsequent dispersion or redispersion in one or more solvent(s) is also possible.

After in the case of capacitors the anode bodies have been impregnated with the dispersion described above, the dispersing agent contained in the dispersion is at least partly removed or hardened, so that a solid electrolyte forms as a polymer layer, which completely or partly covers the dielectric. In this context it is preferable for the covering of the dielectric by the solid electrolyte to be preferably at least 50%, particularly preferably at least 70% and most preferably at least 80%, it being possible for it to be determined by measurement of the capacitance of the capacitor in the dry and in the moist state at 120° C., as is described in DE-A-10 2005 043 828.

The removal or hardening of the dispersing agent is preferably carried out by removing the anode body from the dispersion and drying it, the drying preferably being carried out at a temperature in a range of from 20° C. to 200° C., particularly preferably in a range of from 50° C. to 175° C. and most preferably in a range of from 80° C. to 150° C.

Process step b) and the removal or hardening can also be repeated once or several times, in order in this manner to adapt the thickness of the layer of the solid electrolyte deposited on the dielectric or the degree of filling of the electrolyte in the anode body to the particular requirements.

The stabilizer phase is applied to the polymer layer from process step b) by known processes, e.g. immersion, dipping, pouring, dripping on, spraying, misting on, knife coating, brushing or printing, for example ink-jet, screen or tampon printing. If used for capacitors, the application is preferably carried out by dipping the anode body provided in process step b) into the stabilizer phase and thus impregnating it with the stabilizer. The dipping into or the impregnation with the stabilizer phase is preferably carried out for a period in a range of from 1 second to 120 minutes, particularly preferably in a range of from 10 seconds to 60 minutes and most preferably in a range of from 30 seconds to 15 minutes. The application of the stabilizer phase comprising the stabilizer to the capacitor body can be facilitated, for example, by increased or reduced pressure, vibration, ultrasound or heat.

In connection also with the liquid phase used in the stabilizer phase, it is preferable to use the solvents and dispersing agents contained in the above paragraphs for use for the conductive polymer. This also applies for the liquids mentioned there as preferred. It is thus preferable for the liquid phase in process step c) to contain water or an alcohol or a mixture thereof. Generally, the stabilizer and the liquid phase differ from one another.

All the solvents known to the person skilled in the art in which the corresponding stabilizers can be dissolved or dispersed, preferably dissolved, and with which the capacitor body can be impregnated can be used as the liquid phase. The use of water or an alcohol or a mixture thereof as the liquid phase is particularly preferred according to the invention.

The concentration of the stabilizer in the stabilizer phase is often in a range of from 0.01 to 99 wt. %, preferably in a range of from 0.1 to 50 wt. %, particularly preferably in a range of from 1 to 25 wt. % and most preferably in a range of from 2 to 10 wt. %, in each case based on the stabilizer phase.

The stabilizer phase preferably contains less than 0.5 wt. %, preferably less than 0.1 wt. %, particularly preferably less than 0.01 wt. % and very particularly preferably 0 wt. %, in each case based on the weight of the stabilizer phase, of an electrically conductive polymer. The presence of conductive polymers in the stabilizer phase lowers the storage stability thereof.

Possible stabilizers are all those which appear suitable for this purpose to the person skilled in the art, aromatic compounds containing at least two OH groups, aromatic compounds containing at least two OH groups and one further functional group with a hetero atom which differs from carbon or a combination of at least two of these being preferred. Ester groups are thus to be mentioned by way of example as a functional group with a hetero atom. The organic compounds listed in the following, by themselves or in a combination of two and more, are preferred in particular as the stabilizer.

Hydroxybenzenes and hydroxynaphthalenes and derivatives thereof, in particular 1,3-dihydroxybenzene, 1,4-dihydroxybenzene, 2,3-dihydroxybenzene, dihydroxyalkylbenzenes, dihydroxynaphthalene, trihydroxybenzene (pyrogallol), are first to be listed.

3,4,5-Trihydroxybenzoic acid esters (gallic acid esters), in particular alkyl esters, alkenyl esters, cycloalkyl esters, cycloalkenyl esters, aryl esters, having preferably in each case 1 to 15 C atoms in the aryl or alkyl groups of the esters, are furthermore to be mentioned.

Esters of gallic acid esterified with sugars, which are often called tannin or gallo-tannins (cf. Römpp Chemie, 10th edition (1999), page 4391), are preferably to be mentioned as aromatic compounds containing at least two OH groups and one further functional group with a hetero atom, whereby here the functional group with a hetero atom is an ester group.

In a further embodiment, the one further functional group with a hetero atom is an ester group, a carboxyl group, an amide group. Preferred examples are dihydroxyacetophenones, dihydroxybenzophenones, dihydroxydiphenyl sulphones, tetrahydroxydiphenyl sulphones, tetramethyldihydroxydiphenyl sulphones, hydro dihydroxynaphthalenedicarboxylic acid, dihydroxynaphthalenecarboxylic acid and salts, phenyldihydroxynaphthalenecarboxylic acid, dihydroxynaphthalenedisulphonic acid and salts, dihydroxybenzenedisulphonic acid and salts, trihydroxyacetophenone, trihydroxybenzophenone, trihydroxybenzaldehyde, trihydroxyanthraquinones, tetrahydroxybenzoquinone, tetrahydroxyanthraquinone, polyhydroxybenzoic acids, in particular dihydroxybenzoic acid, dihydroxybenzoic acid esters (methyl, ethyl, propyl ester), trihydroxybenzoic acid, trihydroxybenzoic acid esters (methyl, ethyl, propyl ester). Particularly preferred stabilizers are the abovementioned compounds which carry a sulphonic acid or carboxyl group.

Compounds containing an additional amide group can be hydroxybenzoic acid amides, such as, for example, 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl) amide, 2-hydroxybenzoic acid N-4-(hydroxy-3-methoxybenzyl)amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide.

In addition to the abovementioned compound groups and individual compounds, flavonoids (e.g. quercetin) can also be employed as a stabilizer with the above compounds or also by themselves.

Particularly preferred stabilizers are hydroxybenzenes, hydroxynaphthalenes, gallic acid esters and tannins, and their derivatives. Tannins and derivatives thereof are most preferred.

According to a particular embodiment of the process according to the present invention the liquid stabilizer phase that is applied in process step c) comprises less than 50 wt.-%, particular preferred less than 10 wt.-%, even more preferred less than 1 wt.-%, even more preferred less than 0.1 wt.-%, still more preferred less than 0.01 wt.-% and most preferred no trivalent phosphorus compound as described in US 2010/0136329 A1.

Preferably, in the process according to the invention, after a stabilizer phase has been employed in process step c), the liquid phase is at least partly removed in the further process step d). In the case of capacitors, for example, this removal is preferably carried out by removing the capacitor body comprising the polymer layer from the stabilizer phase and drying it. The drying is preferably carried out at a temperature in a range of from 20° C. to 200° C., particularly preferably in a range of from 50° C. to 175° C. and most preferably in a range of from 75° C. to 150° C. and for a period in a range of from 1 minute to 120 minutes, particularly preferably in a range of from 5 minutes to 90 minutes and most preferably in a range of from 10 minutes to 60 minutes. These conditions are also preferred for other layer compositions.

After the stabilizer has been introduced into the capacitor body in this manner, the electrolyte capacitors can be finished in the manner known to the person skilled in the art. In the case of a tantalum electrolyte capacitor, the capacitor bodies can be covered, for example, with a graphite layer and a silver layer, as is known from DE-A-10 2005 043 828, while in the case of an aluminium wound capacitor, in accordance with the teaching of U.S. Pat. No. 7,497,879 B2, the capacitor body is incorporated in an aluminium beaker, provided with a sealing inspection glass and firmly closed mechanically by crimping. The capacitor can then be freed from defects in the dielectric in a known manner by ageing.

A further contribution to the present invention is made by a layer composition comprising
S1. a substrate with a substrate surface;
S2. a polymer layer following the substrate surface, comprising an electrically conductive polymer;
S3. a stabilizer layer following the polymer layer,
comprising a stabilizer which is an aromatic compound with at least two OH groups.

Here and generally, regions and in particular layers can follow one another directly or also indirectly, spaced by further layers. It is furthermore to be noted that the above statements of this text also apply to this layer composition. It is preferable for the layer composition to be a capacitor. In this, the polymer layer is on the anode body.

The layer compositions according to the invention are outstandingly suitable for use as electronic components, in particular as conductive or antistatic means, as transparent heating, as optionally transparent electrodes, as hole-injecting or hole conducting layers in organic light-emitting diodes, for through-contacting of circuit boards or as a solid electrolyte in electrolyte capacitors. They can advantageously be transparent.

Layer compositions according to the invention can be employed as electronic components, for example also on films, packaging of electronic components, for finishing films of plastics and for coating screens. They can furthermore be used as cathode materials in capacitors, as transparent electrodes e.g. in displays, for example as a substitute for indium-tin oxide electrodes, or as electrical conductors in polymeric electronics. Further possible uses are sensors, batteries, solar cells, electrochromic windows (smart windows) and displays and corrosion protection.

The layer compositions according to the invention are preferably used in capacitors. Such capacitors are preferably employed in electronic circuits, for example as a filter capacitor or decoupling capacitor. Electronic circuits such as are found, for example, in computers (desktop, laptops, servers), in computer peripherals (e.g. PC cards), in portable electronic equipment, such as e.g. mobile telephones, digital cameras or electronic devices for entertainment, in electronic devices for entertainment, such as e.g. in CD/DVD players and computer games consoles, in navigation systems, in telecommunications installations, in domestic appliances, in medical technology, e.g. for defibrillators, in power supplies, such as those based on renewable energy, or in automobile electronics, such as e.g. for hybrid or electric automobiles, are preferred.

The invention is now explained in more detail with the aid of non-limiting figures and examples.

FIG. 1 is a schematic diagram of a section through a part of a capacitor as an example of a layer composition according to the invention. This has an electrode body 1, usually made of a porous electrode material 2, such as aluminium. On the electrode surface 4 of the electrode material 2, a dielectric 3 is formed as a thin layer, so that an anode body 5 which is still porous and comprises the electrode body 1 of the electrode material 2 and the dielectric 3 is formed and, in the context of the layer composition according to the invention, can be regarded as the substrate, the surface of the anode body 5 representing a substrate surface 13 according to the invention. The dielectric 3 is followed, optionally after further layers, by a layer of a solid electrolyte 6 (e.g. of PEDOT/PSS particles), which is the polymer layer or layers, whereby a capacitor body 7 comprising the electrode body 1 of the electrode material 2, the dielectric 3 and the solid electrolyte 6 is formed. The solid electrolyte 6 is followed by a layer of a stabilizer 8, so that a capacitor comprising the electrode body 1 of the electrode material 2, the dielectric 3, the solid electrolyte 6 and the stabilizer 8 is formed. The stabilizer is introduced into the capacitor body 7, for example, such that it completely or partly fills the pores 9.

FIG. 2 shows the structure of a layered body 10 according to the invention, for example an antistatic film, in a more general form. On a substrate 12, in the case of the antistatic film often a PE, PP or PET layer, there is on the substrate surface 13 thereof a conductive layer 11, which is formed as a polymer layer 14 from an electrically conductive polymer 15. On the conductive layer 11, a stabilizer layer 15 with stabilizer 7 is formed.

MEASUREMENT METHODS

Particle Size Determination:

The average particle size of the dispersions was determined by means of an ultracentrifuge. The measurement method and precise procedure is described by W. Scholtan and H. Lange in Kolloid—Z. u. Z. Polymere 250, 782-796 (1972). In deviation therefrom the polymer dispersions were diluted to a measurement extinction of 1 with pure water before the measurement.

In the case of particles which swell in the dispersion, the particle size in the swollen state is determined. A diameter distribution of the particles is based on a weight distribution of the particles in the dispersion as a function of the particle diameter. The $d_{10}$ value of the diameter distribution says in this context that 10% of the total weight of all the particles of the conductive polymer in the dispersion can be assigned to those particles which have a diameter of less than or equal to the $d_{10}$ value. The $d_{50}$ value indicates that 50% of the total weight of all the particles of the conductive polymer in the dispersion can be assigned to those particles which have a diameter of less than or equal to the $d_{50}$ value. The $d_{90}$ value of the diameter distribution says that 90% of the total weight of all the particles of the conductive polymer in the dispersion can be assigned to those particles which have a diameter of less than or equal to the $d_{90}$ value.

Surface Resistance:

On the polyester film coated with the dispersion, conductive silver electrode pairs (Leitsilber 200, Demetron) were applied centrally at 2 different places using a brush. The electrode pairs had a width of approx. 2 mm, a length of 20 mm and a pair separation of 20 mm. After application of the electrodes, the film was dried in air at room temperature for 1 hour. Thereafter, the film was cut into at each of the two ends of the conductive silver electrodes perpendicular to these. A square measurement area with two electrodes opposite each other was thereby formed. The surface resistance was measured with a commercially available ohmmeter (e.g. Metra Hit 12 S from Gossen Metrawatt GmbH). The resistance value displayed corresponded to the surface resistance in Ω/square. The mean of the 2 individual measurements was stated as the measurement value.

Conductivity:

A portion of the dispersion was spin-coated on to a glass microscope slide (26 mm×26 mm×1 mm) by means of a spin-coater (Chemat Technology KW-4A). The sample was dried at 120° C. for 10 min. Two opposite edges of the microscope slide were then coated with conductive silver. After the conductive silver had dried, the two silver strips were contacted and the surface resistance ($R_\square$) was determined with a Keithley 199 Multimeter. The layer thickness was determined with a Tencor Alpha Step 500 Surface Profiler. The specific conductivity σ was determined from the surface resistance and layer thickness d in accordance with $\sigma=1/(R_\square \times d)$.

Viscosity:

Viscosity of the dispersion determined with a rheometer (Haake type RotoVisco 1 with a DG43 double gap cylinder system) at a shear rate of 100 Hz and 20° C.

Solids Content:

For determination of the solids content, 5 g of the dispersion were dried at 100° C. for 14 hours and the solids content was ascertained via the difference in weight.

Capacitance and Dissipation Factor (DF):

The capacitance (in microfarads) and the DF (in %) were determined at 20° C. at 120 Hz by means of an LCR meter (Agilent 4284A).

Equivalent Series Resistance (ESR):

The ESR (in milliohms) was determined at 20° C. at 100 kHz by means of an LCR meter (Agilent 4284A).

Mean:

Unless specified otherwise here, the mean is the arithmetic mean.

EXAMPLES

Example 1

Preparation of a Dispersion of Conductive Polymers 868 g of deionized water, 330 g of an aqueous polystyrenesulphonic acid solution with an average molecular weight of 70,000 and a solids content of 3.8 wt. % were initially introduced into a 2 l three-necked flask with a stirrer and internal thermometer. The reaction temperature was kept between 20 and 25° C. 5.1 g of 3,4-ethylenedioxythiophene were added, while stirring. The solution was stirred for 30 minutes. 0.03 g of iron(III) sulphate and 9.5 g of sodium persulphate were then added and the solution was stirred for a further 24 h.

After the reaction had ended, for removal of inorganic salts 100 ml of a strongly acid cation exchanger (Lewatit S100, Lanxess AG) and 250 ml of a weakly basic anion exchanger (Lewatit MP62, Lanxess AG) were added arid the solution was stirred for a further 2 h. The ion exchanger was filtered off.

Example 2

Preparation of a Formulation of Conductive Polymers 100 g of the dispersion from Example 1 and 4 g of dimethylsulphoxide (DMSO) were stirred intensively in a glass beaker with a stirrer.

Example 3

Preparation of a Homogenized Dispersion of Conductive Polymers

The poly(3,4-ethylenedioxythiophene)/polystyrenesulphonate dispersion from Example 1 was homogenized with a high pressure homogenizer five times under a pressure of 1,500 bar. The dispersion was subsequently concentrated in a rotary evaporator to a solids content of 2.5% and then additionally homogenized with the high pressure homogenizer another five times under a pressure of 1,500 bar.

Example 4

Preparation of a Formulation of Conductive Polymers 44 g of the dispersion from Example 3, 52 g of distilled water and 4 g of dimethylsulphoxide (DMSO) were stirred intensively in a glass beaker with a stirrer.

Example 5

Preparation of a Formulation of Conductive Polymers 100 g of the dispersion from Example 3 and 10 g of ethylene glycol were stirred intensively in a glass beaker with a stirrer and thereafter adjusted to a pH of 3 with aqueous ammonia.

The particle size $d_{10}$ of 16 nm, particle size $d_{50}$ of 20 nm and particle size $d_{90}$ of 36 nm were determined from the dispersion obtained in this way.

The conductivity of the dispersion determined by the above method was 455 S/cm.

Comparison Example 1

Preparation of a Dispersion of Conductive Polymers with Tannin 0.5 wt. %, 1 wt. % and 2 wt. % of tannin (Aldrich—CAS no. 1401-55-4) were added to in each case 10 g of the dispersion from Example 4 in a glass beaker, with intensive stirring. The viscosities of these dispersions and that of the dispersion from Example 4 were determined (viscosity before storage). Thereafter, all 4 dispersions were stored in a closed glass beaker at 40° C. for 21 days and the viscosity of the dispersions was then determined again (viscosity after storage).

The viscosities are to be found in Table 1.

TABLE 1

| Tannin addition [wt. %] | Viscosity before storage [mPas] | Viscosity after storage [mPas] | Ratio of viscosity before storage/ viscosity after storage |
|---|---|---|---|
| 0 | 17 | 17 | 1 |
| 0.5 | 17 | 28 | 1.65 |
| 1 | 17 | 43 | 2.53 |
| 2 | 17 | 64 | 3.76 |

The viscosity of the dispersion without addition of stabilizer does not change due to the storage. On the other hand, the viscosities of the dispersions with addition of stabilizer increase significantly during storage. Comparison. Example 1 shows that the addition of even a relatively small amount of stabilizer leads to a significantly reduced storage stability of the dispersion.

Example 6

Production of Layer Compositions

A portion of the dispersion from Example 2 was knife-coated on to a piece of polyester film 15×20 cm² in size with a spiral bar (Erichson K HAND COATER 620 K bar no. 6). The coating was dried in a circulating air drying cabinet at 130° C. for 20 minutes. The coated polyester films were then each immersed in a solution of a stabilizer for 1 min and thereafter dried in a circulating air drying cabinet at 130° C. for 20 min. The stabilizer solutions used (all Aldrich) are to be found in Table 2. The stabilizer solutions were prepared by addition of the stabilizer to the corresponding solvent with intensive stirring. The surface resistance of the coatings was determined before and after storage, which took place in air at 150° C. for 192 hours. The surface resistances before storage and the increase in the surface resistance after storage, i.e. the ratio of surface resistance after storage to surface resistance before storage, are to be found in Table 2.

Comparison Example 2

Production of Layer Compositions

Coatings were produced from dispersions analogously to Example 6 and measured, but without an immersion in a stabilizer solution. The results are to be found in Table 2.

Comparison Example 3

Production of Layer Compositions 0.1 g of tannin (Aldrich—CAS no. 1401-55-4) was added to 10 g of the dispersion from Example 2 with intensive stirring. Coatings were produced from this dispersion obtained in this way, analogously to Example 6, and measured, but without an impregnation in a stabilizer solution. The results are to be found in Table 2.

TABLE 2

| | Stabilizer | Concentration of stabilizer [wt. %] and solvent | Surface resistance before storage (Ω/square) | Increase in surface resistance after storage |
|---|---|---|---|---|
| Example 6-1 | 1,4-dihydroxy-benzene | 5%, water | 66 | 4.6 |
| Example 6-2 | 1,2,3-trihydroxy-benzene | 5%, water | 65 | 7.2 |
| Example 6-3 | propyl gallate | 5%, ethanol | 66 | 6.7 |
| Example 6-4 | methyl gallate | 5%, ethanol | 67 | 4.2 |
| Example 6-5 | tannin | 1%, water | 62 | 1.5 |
| Example 6-6 | tannin | 5%, water | 65 | 1.4 |
| Example 6-7 | tannin | 10%, water | 67 | 1.4 |
| Comparison Example 2 | none | | 65 | 11.8 |
| Comparison Example 3 | tannin dispersion | | 66 | 2.6 |

As the results from the table show, the post-treatment with stabilizer leads to a significant increase in the heat stability of the surface resistance (Example 6-1 to 6-7) compared with the untreated sample (Comparison Example 2). Comparison of Example 6-5 with Comparison Example 3 moreover shows that the heat stability increases more due to the post-treatment with stabilizer than due to addition of the stabilizer to the dispersion.

Example 7

Production of Layers by Means of In Situ Polymerization

A solution consisting of 0.5 g of 3,4-ethylenedioxythiophene (3.5 mmol), 4.5 g of Fe(III) tosylate (7.9 mmol) and 6.75 g of butanol (91 mmol) was prepared and a portion of the solution was spin-coated on to two glass microscope slides by means of a spin-coater at 2,000 rpm for 5 seconds. The samples were dried at 130° C. for 15 min and then washed in water for 15 min. After drying, two opposite edges of the microscope slide were coated with conductive silver. After the conductive silver had dried, the two silver strips were contacted. The coated microscope slides were then each immersed in a 5 wt. % aqueous tannin solution for 1 min and thereafter dried at 130° C. for 15 min.

The surface resistance was determined with a Keithley 199 Multimeter before and after storage, which took place in air at 130° C. for 93 hours. The surface resistances before storage and the increase in the surface resistance after storage, i.e. the ratio of surface resistance after storage to surface resistance before storage, are to be found in Table 3.

Comparison Example 4

Production of Layers by Means of In Situ Polymerization

Coatings were produced analogously to Example 7 and measured, but without an impregnation in the tannin solution. The results are to be found in Table 3.

Comparison Example 5

Production of Layers by Means of In Situ Polymerization

A solution consisting of 0.5 g of 3,4-ethylenedioxythiophene (3.5 mmol), 4.5 g of Fe(III) tosylate (7.9 mmol), 6.75 g of butanol (91 mmol) and 0.05 g of tannin (Aldrich) was prepared. Precipitates occurred immediately in the solution, and this was therefore not suitable for production of coatings.

TABLE 3

|  | Surface resistance before storage (Ω/square] | Increase in surface resistance after storage |
|---|---|---|
| Example 7 | 235 | 1.9 |
| Comparison Example 4 | 241 | 3.4 |

The results in Table 3 show that the in situ layers post-treated with stabilizer are significantly more heat-stable than untreated layers. By means of Comparison Example 5 it becomes clear that an addition of stabilizer to the reactive in situ solution to increase the heat stability of the layers produced from the solution is not possible.

Example 8

Capacitors 8.1. Production of Oxidized Electrode Bodies:

A porous aluminium foil with dimensions of 170 mm×5 mm (anode foil) was oxidized with a forming voltage of 92 V in a 9% aqueous solution of ammonium adipate. The anode foil and a porous aluminium foil with dimensions of 200 mm×5 mm (cathode foil) were each provided with a contact wire and were then wound up together with two cellulose separator papers and fixed with an adhesive tape. 5 of these oxidized electrode bodies were produced. The separator papers of the oxidized electrode bodies were then carbonized in an oven at 300° C.

8.2 Production of the Solid Electrolyte

The oxidized electrode bodies from 8.1 were immersed in the dispersion from Example 5 for 15 min. Thereafter, drying was carried out at 120° C. for 20 min, at 150° C. for 20 min and finally at 260° C. for 3 min. The capacitors were then impregnated in an aqueous solution containing 5 wt. % of tannin (Aldrich) for 15 minutes. Thereafter, drying was carried out at 120° C. for 20 min and at 150° C. for 20 min.

The electrical values of the 5 capacitors produced in the preceding manner were measured after production of the solid electrolyte and after storage in air in a drying cabinet at 125° C. for 576 hours. The mean electrical values and the relative change in the values (quotient of values after storage for 492 hours and starting values) are to be found in Table 4.

Comparison Example 6

Capacitors

Capacitors were produced as in Example 8 and measured, but no impregnation in a tannin solution was carried out during the production of the solid electrolyte.

The mean electrical values of the 5 capacitors and the relative changes after storage for 576 hours are to be found in Table 4.

TABLE 4

|  | Capacitance (µF) | Change in capacitance | ESR (mΩ) | Change in ESR | DF (%) | Change in DF |
|---|---|---|---|---|---|---|
| Example 8 | 60 | 0.95 | 36 | 1.4 | 2.4 | 2.1 |
| Comparison Example 6 | 60 | 0.76 | 36 | 2.8 | 3.4 | 5.6 |

The capacitors from Example 8 produced according to the invention have a significantly higher stability of their electrical values on storage under elevated temperature than the capacitors from Comparison Example 6. A post-treatment of the solid electrolyte with a stabilizer consequently significantly increases the heat stability of the capacitors.

List of Reference Symbols

1 Electrode body
2 Electrode material
3 Dielectric
4 Electrode surface of anode body
5 Solid electrolyte
6 Capacitor body
7 Stabilizer
8 Pores
9 Layer composition
10 Conductive layer
11 Substrate
12 Substrate surface
13 Polymer layer
14 Electrically conductive polymer
15 Stabilizer layer

The invention claimed is:
1. A capacitor which comprises a layer composition, the layer composition comprising
S1. a substrate with a substrate surface, wherein the substrate comprises an electrode body of an electrode material, the surface of this electrode material being at least partly covered by a dielectric;
S2. a polymer layer following the substrate surface and serving as a layer of a solid electrolyte, the polymer layer comprising an electrically conductive polymer;
S3. a stabilizer layer following the polymer layer, comprising a stabilizer which is an aromatic compound with at least two OH groups.
2. The capacitor according to claim 1, wherein the electrically conductive polymer comprises at least one polythiophene, polypyrrole or polyaniline or one of their derivatives or a mixture of at least two of these.
3. The capacitor according to claim 1, wherein the electrically conductive polymer comprises at least one polythiophene with recurring units chosen from the group consisting of the general formula (I), the general formula (II) or the general formula (III) or a combination of at least two of these

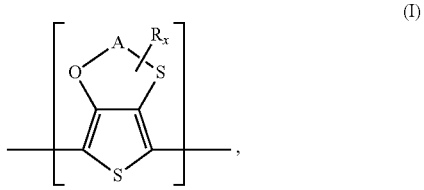

(I)

-continued

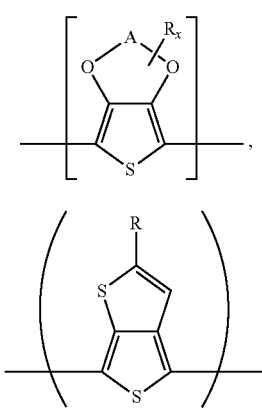

wherein
A represents an optionally substituted $C_1$-$C_5$-alkylene radical,
R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x represents an integer from 0 to 8 and
in the case where several radicals R are bonded to A, these can be identical or different.

4. The capacitor according to claim 1, wherein the electrically conductive polymer is poly(3,4-ethylenedioxythiophene).

5. The capacitor according to claim 1, wherein the electrically conductive polymer additionally comprises at least one polymeric anion.

6. The capacitor according to claim 5, wherein the polymeric anion is polystyrenesulphonic acid.

7. The capacitor according to claim 1, wherein the electrode material is a valve metal or NbO.

8. The capacitor according to claim 1, wherein the electrode material is aluminum.

9. The capacitor according to claim 1, wherein the stabilizer is at least one compound selected from the group consisting of 1,3-dihydroxybenzene, 1,4-dihydroxybenzene, 2,3-dihydroxybenzene, dihydroxyalkylbenzene, trihydroxybenzene, dihydroxynaphthalene and derivatives thereof.

10. The capacitor according to claim 9, wherein the stabilizer is a gallic acid ester.

11. The capacitor according to claim 10, wherein the gallic acid ester is a tannine.

12. The capacitor according to claim 1, wherein the electrically conductive polymer has an electrical conductivity of at least 0.1 S cm$^{-1}$.

13. A process for the production of a layer composition with an electrically conductive layer, comprising the process steps:
 a) providing a substrate with a substrate surface;
 b) forming a polymer layer comprising an electrically conductive polymer on at least a part of the substrate surface;
 c) application of a liquid stabilizer phase, comprising a stabilizer and a liquid phase, onto the polymer layer from process step b), wherein the stabilizer phase comprises less than 0.2 wt. %, based on the stabilizer phase, of the electrically conductive polymer,
wherein the stabilizer is an aromatic compound with at least two OH groups,
wherein the layer composition is a capacitor and wherein the substrate comprises an electrode body of an electrode material, and a dielectric at least partly covers a surface of this electrode material.

14. The process according to claim 13, wherein after application of the stabilizer phase in process step c) the liquid phase is at least partly removed in a further process step d).

15. The process according to claim 13, wherein the stabilizer is at least one compound selected from the group consisting of 1,3-dihydroxybenzene, 1,4-dihydroxybenzene, 2,3-dihydroxybenzene, dihydroxyalkylbenzene, trihydroxybenzene, dihydroxynaphthalene and derivatives thereof.

16. The process according to claim 15, wherein the stabilizer is a gallic acid ester.

17. The process according to claim 16, wherein the gallic acid ester is a tannine.

18. The process according to claim 13, wherein the liquid phase in process step c) comprises water or an alcohol or a mixture thereof.

19. The process according to claim 13, wherein the stabilizer phase in process step c) comprises the stabilizer in a concentration in a range of from 0.1 to 50 wt. %, based on the stabilizer phase.

20. The process according to claim 13, wherein the electrically conductive polymer comprises at least one polythiophene, polypyrrole or polyaniline or one of their derivatives or a mixture of at least two of these.

21. The process according to claim 13, wherein the electrically conductive polymer comprises at least one polythiophene with recurring units chosen from the group consisting of the general formula (I), the general formula (II) or the general formula (III) or a combination of at least two of these

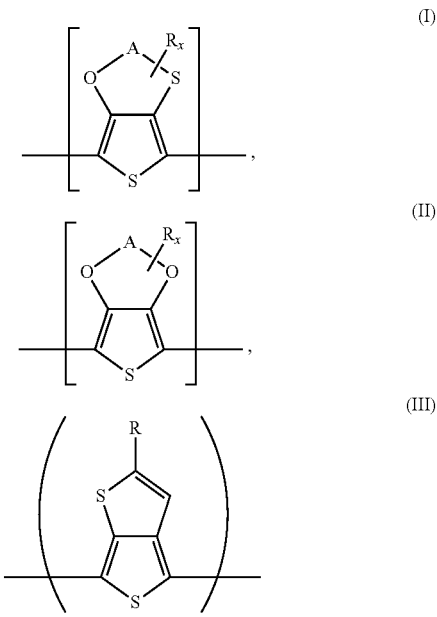

wherein
A represents an optionally substituted $C_1$-$C_5$-alkylene radical,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different.

22. The process according to claim 21, wherein the electrically conductive polymer is poly(3,4-ethylenedioxythiophene).

23. The process according to claim 13, wherein the electrically conductive polymer additionally comprises at least one polymeric anion.

24. The process according to claim 23, wherein the polymeric anion is polystyrenesulphonic acid.

25. The process according to claim 13, wherein the formation of a polymer layer in process step b) is carried out by application of a dispersion containing particles of an electrically conductive polymer and a dispersing agent and the at least partial removal of this dispersing agent.

26. The process according to claim 25, wherein the particles of the dispersion in process step b) have a size ($d_{50}$) of 70 nm and less.

27. The process according to claim 26, wherein the dispersion containing particles of an electrically conductive polymer in process step b) comprises organic solvents, water or mixtures of an organic solvent and water as the dispersing agent.

28. The process according to claim 13, wherein the electrode material is a valve metal or NbO.

29. The process according to claim 13, wherein the electrode material is aluminum.

30. The process according to claim 13, wherein the electrically conductive polymer has an electrical conductivity of at least 0.1 S cm$^{-1}$.

* * * * *